United States Patent [19]

Asai, deceased et al.

[11] Patent Number: 5,130,413

[45] Date of Patent: Jul. 14, 1992

[54] PROCESS FOR PRODUCING UNSATURATED GROUP-TERMINATED HIGH-MOLECULAR WEIGHT POLYALKYLENE OXIDE

[75] Inventors: Yukimitsu Asai, deceased, late of Niigata; by Keiji Asai, legal representative; by Yoshie Asai, legal representative, both of Aichi; Hiroyuki Kawata, Kobe; Tooru Nakagawa, Takasago, all of Japan

[73] Assignee: Kanegafuchi Kagaku Kogyo Kabushiki Kaisha, Osaka, Japan

[21] Appl. No.: 574,862

[22] Filed: Aug. 30, 1990

[30] Foreign Application Priority Data

Aug. 31. 1989 [JP] Japan .................. 1-226860

[51] Int. Cl.⁵ .......................... C08G 65/32
[52] U.S. Cl. .................. 528/408; 525/359.3; 528/409; 568/613; 568/616; 568/617; 568/618; 568/619
[58] Field of Search ............... 528/408, 409; 568/613, 568/616, 617, 618, 619; 525/359.3

[56] References Cited

U.S. PATENT DOCUMENTS 3,951,888 4/1976 Isayama et al. .................. 528/409
4,587,365 5/1986 Anchor .......................... 568/619

FOREIGN PATENT DOCUMENTS 0066179 12/1982 European Pat. Off. .
0196569 10/1986 European Pat. Off. .

OTHER PUBLICATIONS

Patent Abstracts of Japan, vol. 3, No. 7 (C-35) (3011) Jan. 30, 1979 and JP-A-53 134 095 (Kanegafuchi Kagaku Kogyo K.K.) Nov. 22, 1979.
Database WPIL, No. 82-86772E, Derwent Publ. Ltd., London, GB; and JP-A-57143324/Kanegafuchi Chem. Apr. 9, 1982.

Primary Examiner—Morton Foelak
Assistant Examiner—Shelley A. Wright
Attorney, Agent, or Firm—Armstrong, Nikaido, Marmelstein, Kubovcik & Murray

[57] ABSTRACT

A process for producing an unsaturated group-terminated high-molecular weight polyalkylene oxide by adding an alkali metal and/or an alkali metal compound capable of producing an alkali metal hydroxide on reaction with water to a hydroxyl-terminated polyalkylene oxide having a repeating unit represented by formula —$R^1$—O— (wherein $R^1$ represents a divalent alkylene group having from 2 to 8 carbon atoms) to substitute the hydrogen atom of the hydroxyl end group with an alkali metal (alkoxidation) the resulting polyalkylene oxide is reacted with a polyhalogen compound to increase the molecular weight of the polyalkylene oxide and then additional alkali metal and/or alkali metal compound is added before reacting the resulting high-molecular weight polyalkylene oxide with an unsaturated halogen compound to introduce an unsaturated group to the molecular chain terminals. The first addition of alkali metal and/or alkali metal compound capable of producing an alkali metal hydroxide on reacting with water is added in an amount equivalent to or less than the hydroxyl end groups of said polyalkylene oxide and second addition of alkali metal and/or alkali metal compound is added in an amount equivalent to or greater than the remaining hydroxyl end groups.

9 Claims, No Drawings

PROCESS FOR PRODUCING UNSATURATED GROUP-TERMINATED HIGH-MOLECULAR WEIGHT POLYALKYLENE OXIDE

FILED OF THE INVENTION

This invention relates to a process for producing an unsaturated group-terminated high-molecular weight polyalkylene oxide.

BACKGROUND OF THE INVENTION

A polyalkylene oxide having an unsaturated end group is useful as a crosslinking agent or a modifier in vinyl polymerization.

The reaction between an unsaturated group-terminated polyalkylene oxide and a hydrosilane having a hydrolyzable group produces a polymer having a cross-linking silicon end group which is useful as a moisture-curing polymer as disclosed in JP-A-52-73998 (the term "JP-A" as used herein means an "unexamined published Japanese patent application").

The polyalkylene oxides are, in most cases, required to have a high molecular weight of from about 5,000 to 20,000. However, such a high-molecular weight polyalkylene oxide is not readily available on the market.

JP-A-53-134095 discloses a process for producing an unsaturated group-terminated high-molecular weight polyalkylene oxide, in which a hydroxyl-terminated polyalkylene oxide having a relatively low molecular weight is used as a starting material, which comprises converting the hydroxyl end group to an alkoxide group in the presence of an alkali metal hydroxide (alkoxidation). Thereafter a plurality of the polyalkylene oxide molecules are connected to one another by using a polyhalogen compound to increase the molecular weight of the starting polyalkylene oxide (1st step), and then the hydroxyl end groups are converted to unsaturated groups by using an unsaturated halogen compound. This process is illustrated by the following reaction scheme:

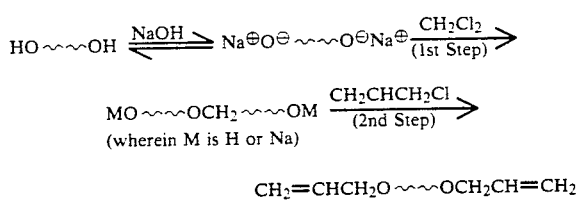

This reference additionally discloses a process in which an alkali metal or an alkali metal compound, capable of producing an alkali metal hydroxide on reaction with water, such as an alkali metal hydride and an alkali metal alkoxide, (hereinafter an alkali metal and an alkali metal compound will be inclusively referred to as an alkoxidizing agent) can be used in place of the alkali metal hydroxide to alkoxidize the hydroxyl end group. Because such alkoxidizing agents have a higher activity than an alkali metal hydroxide, an about equivalent amount of the alkoxidizing agent can be used to conduct the reaction so that purification of the product is easy. However, when the reaction scheme shown above is followed using alkoxidizing agents, the increase in molecular weight and the ability to introduce an unsaturated bond to the product produced in the first step are insufficient, which highligths the fact that the reaction conditions must be strictly controlled before a desired reaction can proceed.

SUMMARY OF THE INVENTION

An object of this invention is to provide a process for producing an unsaturated group-terminated high-molecular weight polyalkylene oxide by using an alkoxidizing agent which makes purification of the product easy.

Another object of this invention is to provide a process for producing an unsaturated group-terminated high-molecular weight polyalkylene oxide in which the increase in molecular weight the introduction of an unsaturated group proceeds easily and sufficiently.

The inventors have conducted extensive investigations and have found that the above objects are accomplished by a process which comprises adding an alkali metal and/or an alkali metal compound capable of producing an alkali metal hydroxide on reacting with water to a hydroxyl-terminated polyalkylene oxide comprising a repeating unit represented by formula —$R^1$—O— (wherein $R^1$ represents a divalent alkylene group having from 2 to 8 carbon atoms) to substitute the hydrogen atom of the hydroxyl end group with an alkali metal (alkoxidation), reacting the resulting polyalkylene oxide with a polyhalogen compound to increase the molecular weight of the polyalkylene oxide (hereinafter referred to as a 1st step), and reacting the resulting high-molecular weight polyalkylene oxide with an unsaturated halogen compound to introduce an unsaturated group to the molecular chain terminals (hereinafter referred to as a 2nd step), wherein said alkali metal and/or alkali metal compound capable of producing an alkali metal hydroxide on reaction with water is added before the 1st step in an amount equivalent to or less than the number of hydroxyl end groups of said polyalkylene oxide and then before the 2nd step additional alkali metal and/or alkali metal compounds are added to the reaction mixture in an amount equivalent to or greater than the remaining hydroxyl end groups.

DETAILED DESCRIPTION OF THE INVENTION

The process of the present invention is characterized in that alkoxidation of the hydroxyl end groups of the starting polyalkylene oxide with an alkoxidizing agent is carried out in two divided stages, once before the 1st step (increase of molecular weight) and then before the 2nd step (introduction of an unsaturated group), to different degrees.

The reason why the alkoxidation reaction realizes progresses so easily to produce high of molecular weight products with introduced unsaturated groups can be accounted for as follows:

In the process of JP-A-53-134095, alkoxidation is effected only once by using a nearly equivalent amount of an alkoxidizing agent, e.g., an alkali metal and a highly active alkali metal compound, before the 1st step as described in the working examples. According to this process, if water is incorporated into the reaction system during or after the reaction progress in the 1st step, the alkoxide group is converted back to a hydroxyl group so that the subsequent 2nd step hardly proceeds. To avoid such an occurrence, the reaction system should be strictly controlled in an amount of the alkoxidizing agent and completely free from moisture.

Further, if the alkoxidizing agent is used in excess in the alkoxidation reaction before the 1st step in an attempt to facilitate progress of the 2nd step, undesired side reactions occur. For example, the reaction illustrated below would take place during the 1st step, resulting in the failure to increase the molecular weight of the starting polyalkylene oxide:

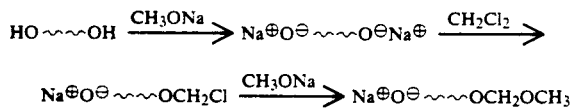

In the process according to the present invention, such disadvantages are eliminated, and an increase in molecular weight and the introduction of an unsaturated group proceed quite easily.

The starting polyalkylene oxide to be used in the present invention is a polymer essentially comprising a repeating unit represented by formula $-R^1-O-$ (wherein $R^1$ represents a divalent alkylene group having from 2 to 8 carbon atoms) and having a hydroxyl group at the terminal(s) thereof. Suitable polyalkylene oxides are those wherein $R^1$ has from 2 to 4 carbon atoms.

A part of the hydrogen atoms of the alkylene group $R^1$ may be substituted with other atom or atomic group. The polyalkylene oxide may be comprised of only the above-described repeating unit ($-R^1-O-$) or may further contain other repeating units. In the latter case, the proportion of the repeating unit of formula $-R^1-O-$ is at least 50% by weight, and preferably at least 80% by weight. The polyalkylene oxide may be either linear or branched. Linear polyalkylene oxides are frequently used.

The starting polyalkylene oxide should be terminated by a hydroxyl group, but all the end groups may not be hydroxyl groups, and part of them may be other groups, e.g., a methoxy group and an allyloxy group. A necessary minimum number of hydroxyl groups per polymer molecule is 1.1, preferably 1.5, in average.

The starting polyalkylene oxide mostly has a degree of polymerization of about 100.

Specific examples of suitable starting polyalkylene oxides include polyoxyalkylene polyols, e.g., polyoxyethylene glycol, polyoxyethylene triol, polyoxyethylene tetraol, polyoxypropylene glycol, polyoxypropylene triol, polyoxypropylene tetraol, polyoxybutylene glycol, polyoxytetramethylene glycol, polyoxypentane glycol, polyoxyhexane glycol, polyoxyheptane glycol, and polyoxyoctane glycol. These polymers may be used either individually or in combinations of two or more.

The alkoxidizing agent which can be used to convert the hydroxyl end groups of the polyalkylene oxides to alkoxide groups include alkali metals, e.g., Na and K; and alkali metal compounds capable of producing an alkali metal hydroxide on reaction with water. Such alkali metal compounds include alkali metal hydrides, e.g., NaH and KH, and alkalr metal alkoxides, e.g., $CH_3ONa$, $CH_3OK$, $C_2H_5ONa$, and $C_2H_5OK$. The preferred compound is an alkali metal alkoxide because it can be used in the form of a solution and evolves no combustible gas such as hydrogen. Solvents which can be used for dissolving alkali metal alkoxides include alcohols, e.g., methanol and ethanol.

In the first alkoxidation reaction which is conducted before the 1st step, the alkoxidizing agent is used in an amount equivalent to or less than the hydroxyl groups in the starting polyalkylene oxide, preferably of from 80 to 100% eq. When the reaction system contains water and the like, the alkoxidizing agent is also consumed by reaction with water. This being the case, the alkoxidizing agent should be added in an increased amount accordingly.

What is important is that the alkoxidizing agent should not be present in excess in the reaction system before the 1st step. As a matter of course, only a slight excess of the alkoxidizing agent may remain in the reaction system to be subjected to the 1st step as long as the objects of the present invention are fulfilled.

Reaction conditions of alkoxidation are not particularly limited, and conventional conditions of temperature and pressure can be used. When an alkali metal alkoxide is used as, the alkoxidizing agent, the reaction is preferably carried out at a high temperature of 50° C. or more, preferably between 100° C. and 200° C., under reduced pressure of not more than 50 mmHg, preferably not more than 10 mmHg, in order to drive alcohol, a by-product of the reaction, out of the system.

Specific examples of suitable polyhalogen compounds which can be used in the 1st step (to increase the molecular weight of the starting polyalkylene oxides) are methylene chloride, chloroform, carbon tetrachloride, methylene bromide, methyleneiodide,monochloromonobromomethane,1,1-dichloro-2,2-dimethylpropane, benzal chloride, benzal bromide, bis(chloromethyl)benzene, bis(bromomethyl)benzene, tris(chloromethyl)benzene, 4,4'-bis(chloromethyl)biphenyl, and bis(chloromethyl)naphthalene. These polyhalogen compounds may be used either individually or in combinations of two or more. Preferred polyhalogen are dihalogen alkylene compounds, e.g., methylene chloride and methylene bromide.

The reaction of the 1st step can be carried out at a temperature of from 0° to 200° C. under normal or reduced pressure without any particularly limits on reaction conditions. Through the 1st step, the relatively low molecular weight of the starting polyalkylene oxide (about 500 to 5,000) is increased to about 1,000 to 20,000.

In the second alkoxidation reaction which is conducted before the 2nd step, the amount of the alkoxidizing agent to be added is at least equivalent to the hydroxyl end groups of the high-molecular weight polyalkylene oxide obtained in the 1st step. However, too large an excess results in an increase of by-products in the following steps, which will complicate purification. In general, the alkoxidizing agent is preferably added in such an amount that the alkoxidizing agent may be present in the reaction system after completion of alkoxidation of the hydroxyl end groups in 5 to 50 % eq. excess to the alkoxide end groups.

The unsaturated halogen compound which can be used in the 2nd step preferably includes organic halogen compounds having a vinyl group, a highly reactive unsaturated group, and represented by the formula $CH_2=CH-R^2-X$ (wherein $R^2$ represents a divalent organic group; and X represents a halogen atom). Specific examples of such an unsaturated halogen compound are allyl chloride, allyl bromide, vinyl(chloromethyl)benzene, allyl(chloromethyl)benzene, allyl(bromomethyl)benzene, allyl chloromethyl ether, allyl(chloromethoxy)benzene, 1-butenyl chloromethyl ether, 1-hexenyl(chloromethoxy)benzene, and allyloxy(chloromethyl)benzene. These unsaturated halogen compounds may be used either individually or in combinations of two or more.

The reaction of the 2nd step can be carried out under the same conditions as in the 1st step without any particular limits on reaction conditions.

Upon completion of the 2nd step, there is obtained an unsaturated group-terminated high-molecular weight polyalkylene oxide. Thereafter, the product can be isolated through conventional purification procedures.

By the process of the present invention, there can be easily produced an unsaturated group-terminated high-molecular weight polyalkylene oxide having a molecular weight of, e.g., from about 5,000 to 20,000 and containing unsaturated end groups in an amount of, e.g., 90 mol % or more.

The present invention is now illustrated in greater detail with reference to the following Examples, but it should be understood that the present invention is not construed as being limited thereto. All the percents are by weight unless otherwise indicated.

EXAMPLE 1

In a 1 l-volume pressure vessel equipped with a stirrer in which the atmosphere had been displaced with nitrogen was charged 320 g (0.10 mol) of polyoxypropylene glycol having an average molecular weight of 3,200 and containing hydroxyl end groups in a proportion of 89% based on the total end groups (the remaining end groups were unsaturated groups, e.g., an isopropenyl group). Subsequently, 30.9 g of a 28% solution of sodium methoxide in methanol (sodium methoxide content: 8.66 g, 0.16 mol) was added thereto (1st alkoxidation). The temperature was raised to 130° C., and the vessel was evacuated for 2 hours. When the inner pressure was reduced to 1 mmHg, 5.1 g (0.06 mol) of dichloromethane was added thereto to conduct a reaction at 130° C. for 4 hours (1st step).

The reaction system having been subjected to the first alkoxidation before the 1st step reaction was analyzed by infrared spectrophotometry to determine the intensity of the absorption spectrum assigned to a hydroxyl group which appears in the vicinity of 3500 cm$^{-1}$. It was proved, as a result, that 90% of the hydroxyl groups contained in the starting polyoxypropylene glycol had been converted to methoxide groups.

Then, 10.3 g of a 28% solution of 2.89 g (0.054 mol) of sodium methoxide in methanol was added to the reaction system, and the vessel was evacuated at 130° C. for 1 hour (second alkoxidation). When the inner pressure was reduced to 1 mmHg, 8.0 g (0.105 mol) of allyl chloride was added thereto to conduct a reaction at 130° C. for 2 hours (2nd step). The reaction system after the second alkoxidation before the 2nd step was found to contain 0.03 mol of sodium methoxide.

After completion of the 2nd step reaction, the reaction product was diluted with 1000 g of n-hexane, and 50 g of aluminum silicate was added to the solution. The mixture was stirred for 1 hour and filtered. The filtrate was evaporated to remove the volatile content to obtain 300 g of a polypropylene oxide polymer having an average molecular weight of 8000. The end groups of the resulting polymer were found to comprise 98% of an unsaturated group and 2% of a hydroxyl group.

EXAMPLES 2 TO 5

An unsaturated group-terminated high-molecular weight polyalkylene oxide was produced in the same manner as in Example 1, except that various alkoxidizing agents, polyhalogen compounds and unsaturated halogen compounds were used, and the reactions were conducted under various conditions as shown in Table 1. The results obtained are shown in the Table 1.

TABLE 1

| | Example 1 | Example 2 | Example 3 | Example 4 | Example 5 |
|---|---|---|---|---|---|
| 1st Alkoxidation: | | | | | |
| Alkoxidizing agent | 28% CH$_3$ONa | 28% CH$_3$ONa | 20% CH$_3$OK | 24% CH$_3$ONa | 20% 3OK |
| (g) | 30.9 | 30.9 | 56.2 | 36.0 | 56.2 |
| (mol) | 0.160 | 0.160 | 0.160 | 0.160 | 0.160 |
| Reaction Temp. (°C.) | 130 | 150 | 100 | 130 | 130 |
| Reduced Pressure (mmHg) | 1 | 1 | 5 | 3 | 2 |
| Reaction Time (hr) | 2 | 1 | 2 | 1 | 2 |
| Rate of Alkoxidation (%) | 90 | 90 | 90 | 90 | 90 |
| Mol. Wt. Increase: | | | | | |
| Polyhalogen Compound | CH$_2$Cl$_2$ | CH$_2$BrCl | CH$_2$Cl$_2$ | ClCH$_2$OCH$_2$Cl | CH$_2$Br$_2$ |
| (g) | 5.1 | 7.8 | 5.1 | 8.7 | 11.2 |
| (mol) | 0.060 | 0.060 | 0.060 | 0.077 | 0.063 |
| Reaction Temp. (°C.) | 130 | 80 | 120 | 100 | 70 |
| Reaction Time (hr) | 4 | 3 | 3 | 5 | 4 |
| 2nd Alkoxidation: | | | | | |
| Alkoxidizing Agent | 28% CH$_3$ONa | 28% CH$_3$ONa | 20% CH$_3$OK | 24% CH$_3$ONa | 20% CH$_3$OK |
| (g) | 10.3 | 13.5 | 18.7 | 12.0 | 12.5 |
| (mol) | 0.054 | 0.070 | 0.053 | 0.053 | 0.036 |
| Reaction Temp. (°C.) | 130 | 150 | 120 | 130 | 110 |
| Reduced Pressure (mmHg) | 1 | 2 | 5 | 5 | 3 |
| Reaction Time (hr) | 1 | 2 | 1 | 1 | 1 |
| Excess of Metal Alkoxide (mol) | 0.03 | 0.05 | 0.03 | 0.03 | 0.015 |
| Introduction of Unsaturated Group: | | | | | |
| Unsaturated Halogen Compound | CH$_2$=CHCH$_2$Cl | CH$_2$=CHCH$_2$Br | CH$_2$=CHCH$_2$— 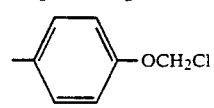—OCH$_2$Cl | CH$_2$=CHCH$_2$Cl | CH$_2$=CHCH$_2$—  —OCH$_2$Cl |
| (g) | 8.0 | 12.2 | 26.3 | 10.1 | 13.9 |
| (mol) | 0.105 | 0.101 | 0.144 | 0.131 | 0.131 |
| Reaction Temp. (°C.) | 130 | 100 | 120 | 130 | 100 |
| Reaction Time (hr) | 2 | 2 | 2 | 3 | 3 |
| Produced Polyoxypropylene | | | | | |

TABLE 1-continued

|  | Example 1 | Example 2 | Example 3 | Example 4 | Example 5 |
|---|---|---|---|---|---|
| Glycol: | | | | | |
| Average Molecular Weight | 8000 | 7900 | 8100 | 9500 | 9000 |
| Olefin End Group (%) | 98 | 98 | 97 | 98 | 98 |
| OH group (%) | 2 | 2 | 3 | 2 | 2 |
| Starting Polyoxypropylene Glycol: | | | | | |
| Average Molecular Weight | 3200 | 3200 | 3200 | 3200 | 3200 |
| OH Group (%) | 89 | 89 | 89 | 89 | 89 |
| (equivalent) | 0.178 | 0.178 | 0.178 | 0.178 | 0.178 |
| Amount Used (g) | 320 | 320 | 320 | 320 | 320 |
| (mol) | 0.1 | 0.1 | 0.1 | 0.1 | 0.1 |

EXAMPLES 6 TO 9

An unsaturated group-terminated high-molecular weight polyalkylene oxide was produced in the same manner as in Example 1, except that the starting polyoxypropylene glycol was replaced with each of the polyoxyalkylene polymers shown in Table 2 below and the reactions were conducted under the conditions shown in the Table.

COMPARATIVE EXAMPLE

An unsaturated group-terminated high-molecular weight polyoxyalkylene was produced in the same manner as in Example 1, except that alkoxidation was carried out only once prior to completion of the 1st step (molecular weight increased by using sodium methoxide in an amount equivalent to a hydroxyl group of the starting polyoxypropylene glycol, followed by the molecular weight increase reaction and then the reaction for introducing of the unsaturated end group. The resulting polymer had a low content of an unsaturated end group.

TABLE 2

|  | Example 6 | Example 7 | Example 8 | Example 9 |
|---|---|---|---|---|
| 1st Alkoxidation: | | | | |
| Alkoxidizing Agent | 28% $CH_3ONa$ | 28% $CH_3ONa$ | 28% $CH_3ONa$ | 28% $CH_3ONa$ |
| (g) | 102.1 | 74.2 | 31.3 | 62.5 |
| (mol) | 0.529 | 0.385 | 0.162 | 0.324 |
| Reaction Temp. (°C.) | 130 | 130 | 130 | 130 |
| Reduced Pressure (mmHg) | 1 | 1 | 1 | 1 |
| Reaction Time (hr) | 2 | 2 | 2 | 2 |
| Rate of Alkoxidation (%) | 90 | 90 | 90 | 90 |
| Mol. Wt. Increase: | | | | |
| Polyhalogen Compound | $CH_2Cl_2$ | $CH_2Cl_2$ | $CH_2Cl_2$ | $CH_2Cl_2$ |
| (g) | 21.7 | 5.6 | 5.1 | 13.7 |
| (mol) | 0.255 | 0.066 | 0.06 | 0.161 |
| Reaction Temp. (°C.) | 130 | 130 | 130 | 130 |
| Reaction Time (hr) | 4 | 4 | 4 | 4 |
| 2nd Alkoxidation: | | | | |
| Alkoxidizing Agent | 28% $CH_3ONa$ | 28% $CH_3ONa$ | 28% $CH_3ONa$ | 28% $CH_3ONa$ |
| (g) | 22.7 | 16.5 | 7.0 | 13.9 |
| (mol) | 0.118 | 0.086 | 0.036 | 0.072 |
| Reaction Temp. (°C.) | 130 | 130 | 130 | 130 |
| Reduced Pressure (mmHg) | 1 | 1 | 1 | 1 |
| Reaction Time (hr) | 1 | 1 | 1 | 1 |
| Excess of Metal Alkoxide (mol) | 0.05 | 0.04 | 0.01 | 0.03 |
| Introduction of Unsaturated Group: | | | | |
| Unsaturated Halogen Compound | $CH_2=CHCH_2Cl$ | $CH_2=CHCH_2Cl$ | $CH_2=CHCH_2Cl$ | $CH_2=CHCH_2Cl$ |
| (g) | 10.8 | 10.8 | 10.8 | 10.8 |
| (mol) | 0.141 | 0.141 | 0.141 | 0.141 |
| Reaction Temp. (°C.) | 130 | 130 | 130 | 130 |
| Reaction Time (hr) | 2 | 2 | 2 | 2 |
| Produced Polyalkylene Oxide: | | | | |
| Average Molecular Weight | 8000 | 9000 | 8300 | 11500 |
| Olefin End Group (%) | 96 | 98 | 97 | 98 |
| OH Group (%) | 4 | 2 | 3 | 2 |
| Starting Polyalkylene Oxide: | | | | |
| Kind | polyoxyethylene glycol | polyoxypropylene triol | polyoxytetramethylene glycol | polyoxyhexane glycol |
| Average Molecular Weight | 1200 | 2800 | 3500 | 2200 |
| OH Group | | | | |
| (%) | 98 | 95 | 90 | 90 |
| (mol) | 0.588 | 0.428 | 0.18 | 0.36 |
| Amount Used | | | | |
| (g) | 360 | 420 | 350 | 440 |
| (mol) | 0.3 | 0.15 | 0.1 | 0.2 |

While the invention has been described in detail and with reference to specific embodiments thereof, it will be apparent to one skilled in the art that various changes and modifications can be made therein without departing from the spirit and scope thereof.

What is claimed is:

1. A process for producing an unsaturated group-terminated high-molecular weight polyalkylene oxide, comprising: (a) adding an alkali metal, an alkali metal compound capable of producing an alkali metal hydroxide on reaction with water, or a mixture thereof, to hydroxyl-terminated polyalkylene oxide comprising a repeating unit represented by formula $-R^1-O-$, wherein $R^1$ represents a divalent alkylene group having from 2 to 8 carbon atoms, to replace the hydrogen atom of the hydroxyl end group with an alkali metal, (b) reacting the resulting polyalkylene oxide with a polyhalogen compound to increase the molecular weight of the polyalkylene oxide; (c) adding an alkali metal, an alkali metal compound capable of producing an alkali metal hydroxide on reaction with water, or a mixture thereof, to the polyalkylene oxide of increased molecular weight, and (d) reacting the polyalkylene oxide of increased molecular weight with an unsaturated halogen compound to introduce an unsaturated group to the molecular chain terminals, wherein said alkali metal, alkali metal compound capable of producing an alkali metal hydroxide on reaction with water, or a mixture thereof, is added before step (b) in an amount equivalent to or less than the hydroxyl end groups of said polyalkylene oxide and then added before step (d) in an amount equivalent to or more than the remaining hydroxyl end groups.

2. A process as claimed in claim 1, wherein said hydroxyl-terminated polyalkylene oxide is at least one hydroxy-terminated polyalkylene oxide selected from the group consisting of polyoxyethylene glycol, polyoxyethylene triol, polyoxyethylene traol, polyoxypropylene glycol, polyoxypropylene triol, polyoxypropylene tetraol and polyoxybutylene glycol.

3. A process as claimed in claim 1, wherein said alkali metal is at least one alkali metal selected from the group consisting of sodium, potassium and mixtures thereof.

4. A process as claimed in claim 1, wherein said alkali metal compound is an alkali metal hydride.

5. A process as claimed in claim 1, wherein said alkali metal compound is an alkali metal alkoxide.

6. A process as claimed in claim 5, wherein said alkali metal alkoxide is an alkali metal alkoxide dissolved in an alcohol.

7. A process as claimed in claim 1, wherein said polyhalogen compound is a dihalogen alkylene compound.

8. A process as claimed in claim 1, wherein said unsaturated compound is an organic halogen compound represented by formula:

$$CH_2=CH-R^2-X$$

wherein $R^2$ represents a divalent organic group; and X represents a halogen atom.

9. A process as claimed in claim 1, wherein said unsaturated halogen compound is an allyl halide.

* * * * *